United States Patent [19]
Carter

[11] Patent Number: 5,326,175
[45] Date of Patent: Jul. 5, 1994

[54] DEBRIS/STORAGE BAG

[76] Inventor: James E. Carter, P.O. Box 291054, Port Orange, Fla. 32129

[21] Appl. No.: 867,496

[22] Filed: Apr. 13, 1992

[51] Int. Cl.$^5$ ............................................. B65D 33/14
[52] U.S. Cl. ........................................ 383/22; 383/16
[58] Field of Search ............................. 383/22, 16, 38; 224/42.46 R; 382/24

[56] References Cited

U.S. PATENT DOCUMENTS

| | | | |
|---|---|---|---|
| 501,520 | 7/1893 | Lyle | 224/42.46 R |
| 2,430,763 | 11/1947 | Foster | 383/22 |
| 2,563,933 | 8/1951 | Hipps et al. | 383/24 X |
| 2,636,531 | 4/1953 | Kelly | 383/24 |
| 4,186,859 | 2/1980 | Frankfort et al. | 224/42.46 R |
| 4,830,238 | 5/1989 | Widinski et al. | 224/42.46 R |
| 4,843,994 | 7/1989 | Wilson et al. | 383/22 X |
| 5,012,963 | 5/1991 | Rosebaum | 383/38 X |
| 5,040,711 | 8/1991 | Niederhauser et al. | 224/42.46 R |
| 5,226,576 | 7/1993 | Ellsworth | 383/22 X |

FOREIGN PATENT DOCUMENTS

| | | | |
|---|---|---|---|
| 3002106 | 7/1981 | Fed. Rep. of Germany | 383/16 |
| 2625482 | 7/1989 | France | 383/16 |
| 668355 | 12/1988 | Switzerland | 383/16 |

Primary Examiner—Allan N. Shoap
Assistant Examiner—Christopher McDonald
Attorney, Agent, or Firm—Prose

[57] ABSTRACT

A debris/storage bag that attaches with straps connected to at least two different sides of the bag. The straps are designed to attach to both fixed and variable distances. The debris/storage bag features: (1) a pocket or pockets attached preferably to the exterior of the bag; (2) a flap covering for the opening of the debris/storage bag that can be fastened to keep the contents of the bag from falling out; (3) elastic and non-elastic straps used in conjunction with adjustable fasteners to attach the debris/storage bag to a wide variety of objects with different size circumferences and varying distances between the top and bottom fastening positions.

4 Claims, 5 Drawing Sheets

DEBRIS/STORAGE BAG

BACKGROUND OF THE INVENTION

1. Field of the Invention

The present invention relates to a debris/storage bag and, more specifically, to novel, improved debris/storage bag which is designed for use on, but not exclusive to, power equipment used in the clean up and maintenance of all kinds of outdoor areas.

2. Description of the Prior Art

Debris/storage bags are known and have existed probably as early as when man first found a way to sew two animal skins together leaving one side open to form a pocket and attaching two straps at the top of the opening so that he could tie the bag between two different trees so that the animals could not get his food. Although no debris/storage bag could be found with prior patent art, those of which I am aware are disclosed in: (1) an outdoor power equipment parts and supply catalogue, Greenline Distributors, Inc., Smyrna, Ga.; (2) a company in Sanford, Fla. that manufactures a debris bag called the Debris Bagger. Both of these debris bags have straps that attach from the top of the bag; the first debris bag has two straps, each strap consists of two webbing strips that are tied around the handlebars like an apron string. The second debris bag has a similar strap arrangement; however, instead of tying the straps together, this debris bag secures using hook and loop fasteners sewn on the webbing strips.

In today's highly competitive landscape maintenance industry it is very important to do high quality work. One of the most obvious signs of poor quality work is to have papers, cans, and other debris kicked to the side and then forgotten and left there when the job is completed. Operators of power equipment know this and for years have been improvising ways to deal with the problem by attaching makeshift debris/storage bags to their handlebars. Some of the most common ones are plastic grocery and fertilizer bags, mesh potato sacks, 5-gallon plastic buckets with handles, citrus bags and burlap pecan bags. The need for debris/storage bags is not limited to just outdoor power equipment but also includes such items as dollies, hand carts, baby strollers, wheelchairs and sailboat cabins. These prior art embodiments have, however, a serious deficiency. That being the ability to secure the debris/storage bag in place to prevent it from swinging when put in motion. After debris has been put into the bag, the weight of that debris will create a back and forth movement. Depending on how the bag is attached to the handlebars, it will interfere with the operator or the operation of the machine. If placed in front of the operator, hanging straight down from the handlebars, the motion would carry the debris/storage bag back toward and possibly into the operator. If fastened sideways on the machine it would swing out past the normal operating space of the machine when turning and could cause problems in snagging onto something or by damaging something if it were hit by the weight of the debris inside.

Another feature, a pocket or pockets have been added preferably to the outside of the debris/storage bag, to carry additional items that would be separate from the contents of the debris/storage bag such as a towel, cold drink, tools, etc. while operating the machine.

None of the known debris/storage bags have the ability to be attached to an object other than from the top. The ability to attach the debris/storage bag in a fixed area from two or more sides is one of the main objectives of the present invention. Nor does any known debris/storage bag have a pocket or pockets attached to the bag to provide additional carrying space that would keep the contents separate from that which would be put inside the debris/storage bag. This also is one of the main objectives of the present invention.

SUMMARY OF THE INVENTION

The present invention provides an inexpensive, lightweight debris/storage bag with elastic and non-elastic straps extending from at least two different sides of the debris/storage bag so that once the present invention is attached to an object it will remain attached to that object in the designated area regardless of any motion.

The novel debris/storage bag is manufactured from two pieces of material that are secured together on three sides forming a pocket. The front panel is gusseted enabling the pocket to stand open providing easy access for placement and removal of any debris or stored items.

The type and weight of material the present invention is made of is determined by what the use of the present invention will be. For example, if used to store potatoes or if the contents needed to be visible or hold yard debris, a mesh material would be best suited because of ventilation, visibility, and the ability to filter out sand, grit and smaller debris that the holes in the mesh would provide. If books or personal papers were being stored, a solid material would be more appropriate and better suited for the purpose. The debris/storage bag can be made from material that is weather resistant, such as the material stated here-in as preferable or non-weather resistant material again, depending on its use.

The use of elastic webbing for the straps gives the debris/storage bag the versitility necessary to attach to objects when the distance is variable or unknown between fastening points.

The fasteners for the straps also play a vital role in the versitility of the present invention. The fasteners, though not limited to the type stated herein, are fully adjustable, capable of fastening the straps to or around any size circumference and assist in the correct tension and placement of the debris/storage bag and allow for easy removal and reattachment of said bag.

The combination of elastic and non-elastic straps with a variety of combinations of adjustable fasteners allows the debris/storage bag to be attached to almost any object or objects in nearly all locations when the distance between the top fastening position and the bottom fastening position is known or when the distance between top fastening position and the bottom fastening position is unknown. This is one of the many unique abilities of the present invention.

A pocket or pockets have been attached to the present invention to provide an area or areas to carry other items that would be separate from that which is put inside of the debris/storage bag. The pocket or pockets can be gusseted like the front panel of the debris/storage bag for the same easy access or custom cut to fit a particular item.

Finally, a flap closure that fastens shut can be added for the opening of the debris/storage bag to prevent the contents from coming out.

BRIEF DESCRIPTIONS OF THE DRAWINGS

DETAILED DESCRIPTION OF THE INVENTION

Figure 1:
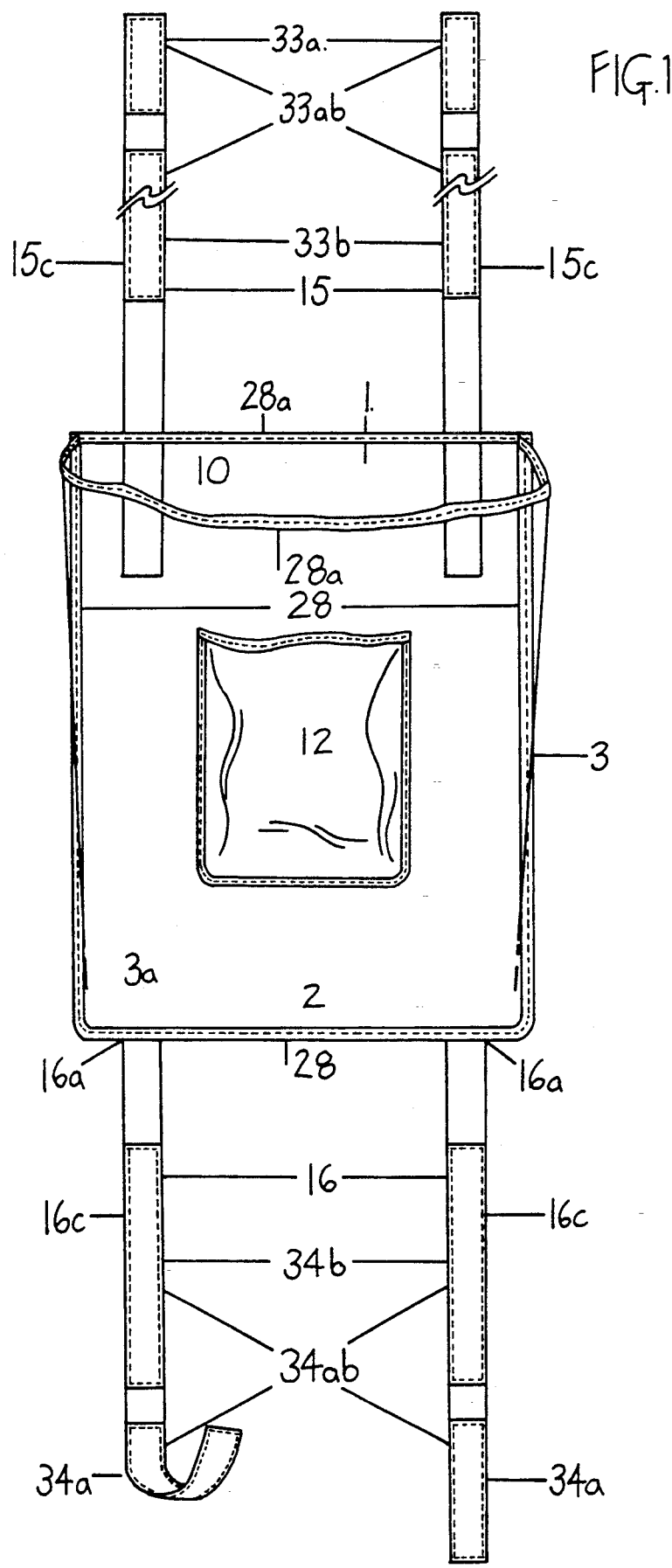
FIG. 1 shows the debris/storage bag laid flat and unattached with the fastening devices left open to more clearly illustrate how the debris/storage bag attaches.

As shown in the drawings, the device of the present invention is a debris/storage bag 3 with straps 15, 16 attached on two separate sides of the debris/storage bag. These straps will be referred to as the top strap 15 and the bottom strap 16 for clarity sake from now on. These straps 15, 16 enable the debris/storage bag 3 to be attached to an object and remain attached to that object regardless of motion. The adjustable fasteners 33ab., 34ab., 43ab., 44ab., allow the straps 15, 16 to secure to many objects with different size circumferences for both fixed or known distances between fastening points as well as variable or unknown distances between fastening points.

Figure 2:
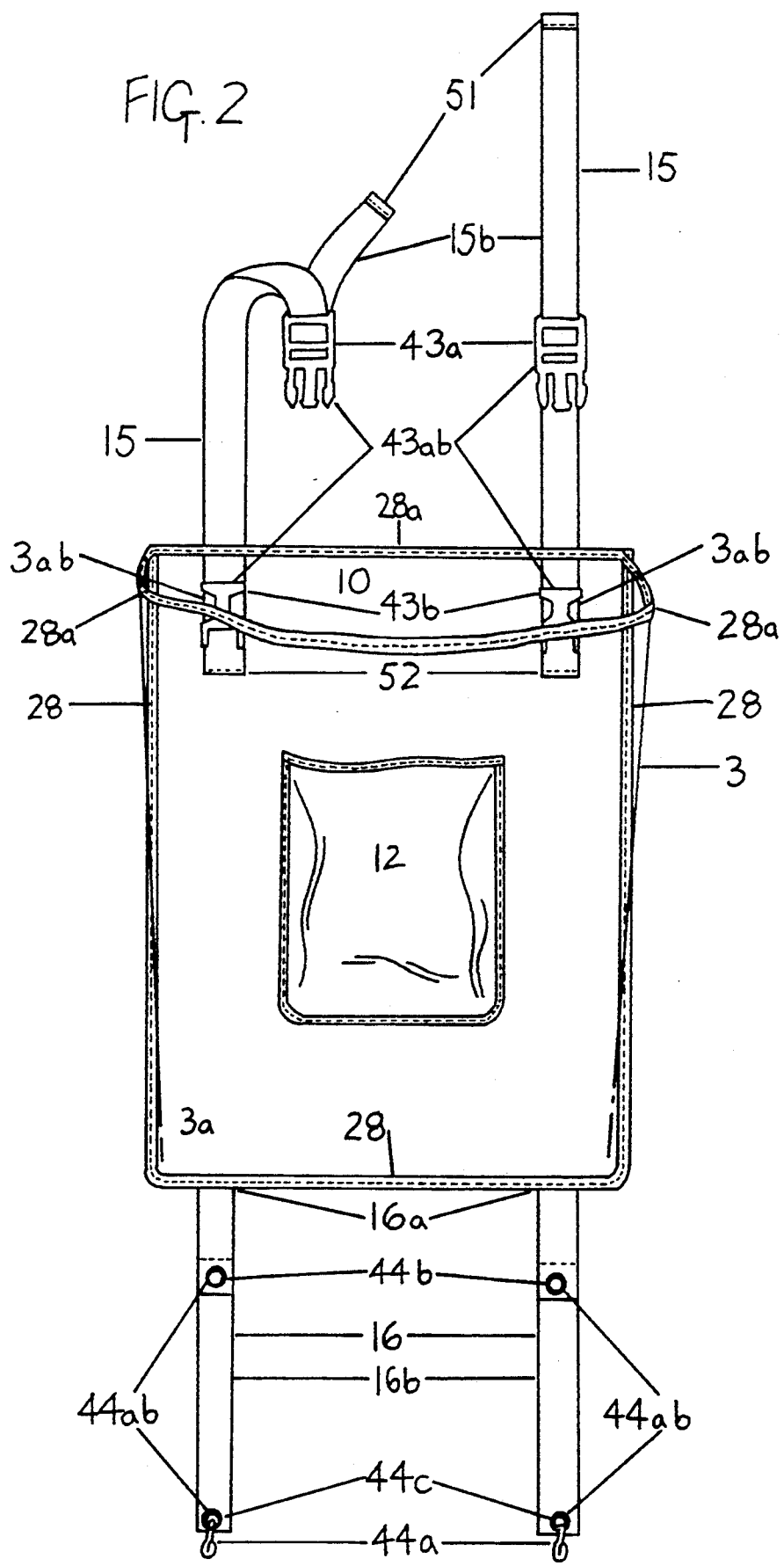
FIG. 2 is the same view of the debris/storage bag but with different fastening devices to attach the straps in place.

The debris/storage bag 3a. as shown in FIG. 1 and FIG. 2 is compiled of two panels of material that are bound together 28, preferably with polypropylene webbing, on three sides. The material for the front panel 2 is preferably cut so that the pocket that is formed is gusseted enabling easier access to the inside of the bag 3a. A binding tape preferably nylon is used to cover the raw edge 28a. of the material that forms the opening 10 of the debris/storage bag 3a. Attached to the outside of the bag 3a. FIGS. 1, 2, 3, 4 is a pocket or pockets 12, this pocket or pockets 12 could be attached on the inside of the debris/storage bag 3a. if the use warranted it being placed there. The pocket or pockets 12 are for the added convenience of the user, enabling the debris/storage bag 3 to carry additional items without interfering, while at the same time keeping them separate from what is placed in the debris/storage bag 3a.

The straps 15, 16 are preferably polypropylene webbing and woven polyester elastic webbing. The fixed and rigid strength of the polypropylene webbing combined with the stretch and flexibility of the woven polyester elastic webbing used together or used by themselves help to provide the ability for the debris/storage bag 3 to fasten to so many different objects with such a variance in distances between the top fastening position and bottom fastening position. This is one of the main objectives of the present invention.

Figure 3:
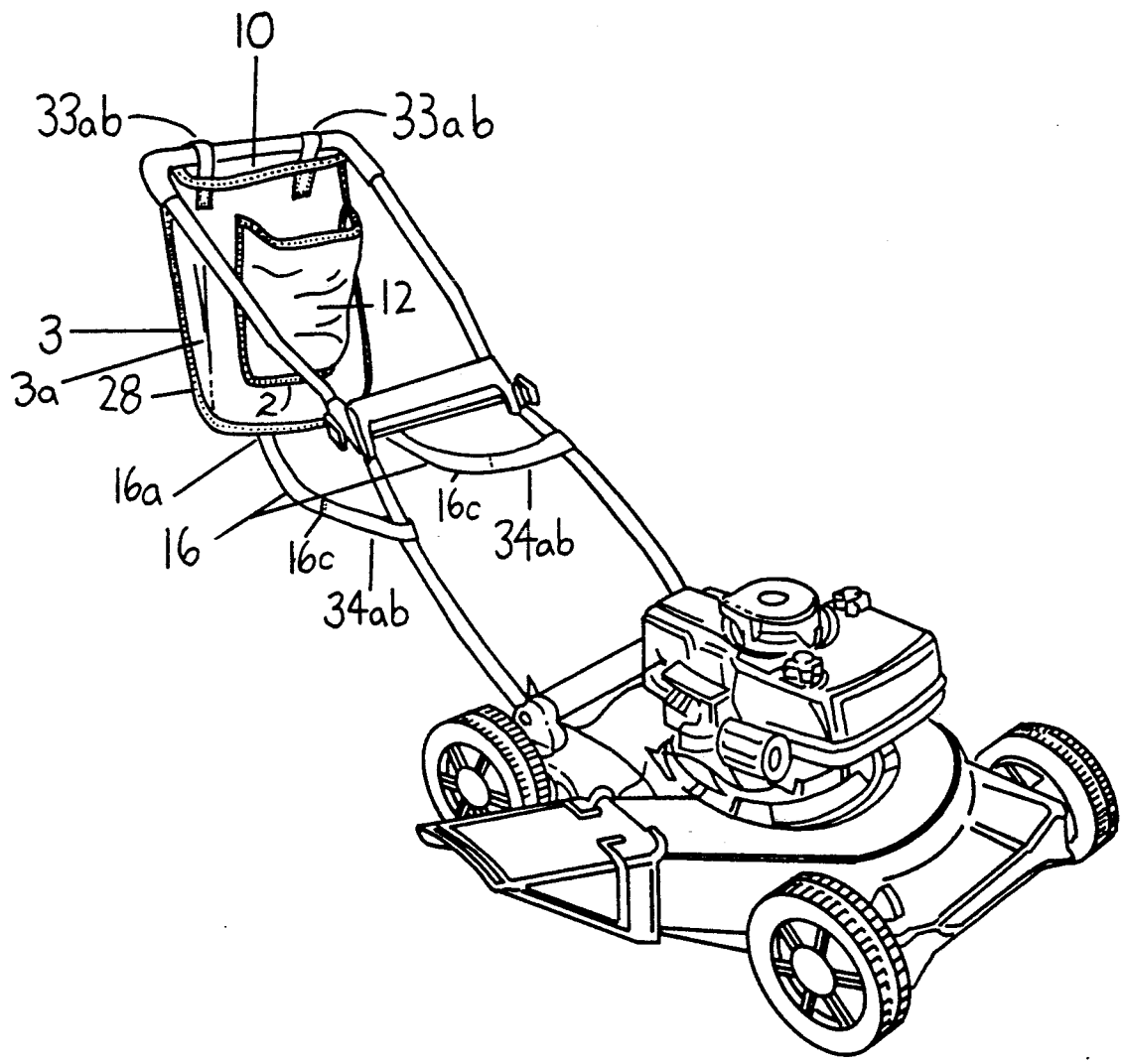
FIG. 3 is a front side view of the present invention properly attached to a homeowner/trim lawn mower.
Figure 4:
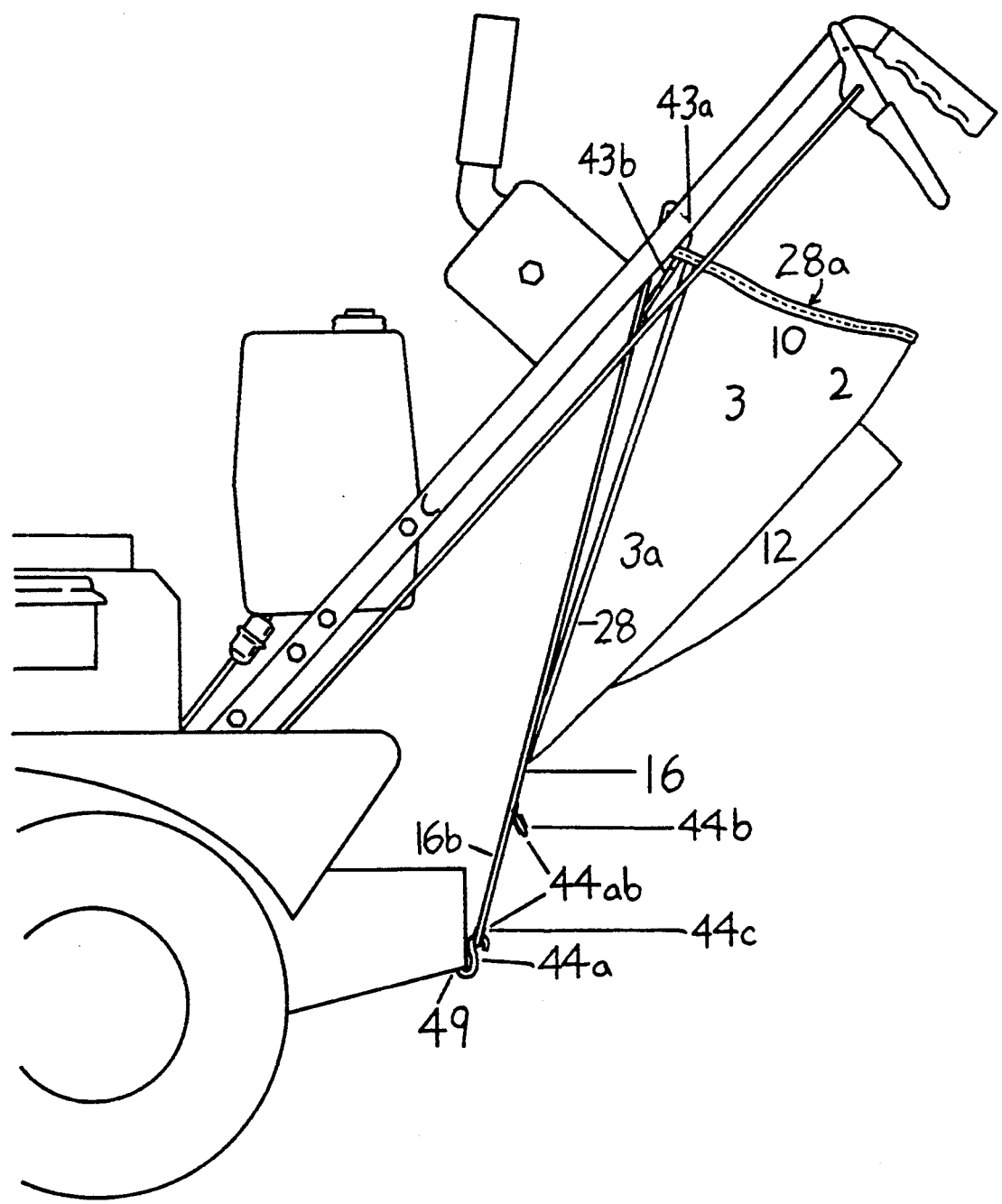
FIG. 4 is a side view of the debris/storage bag properly attached to the handlebars and rear deck of a commercial mid-size lawn mower.
Figure 5:
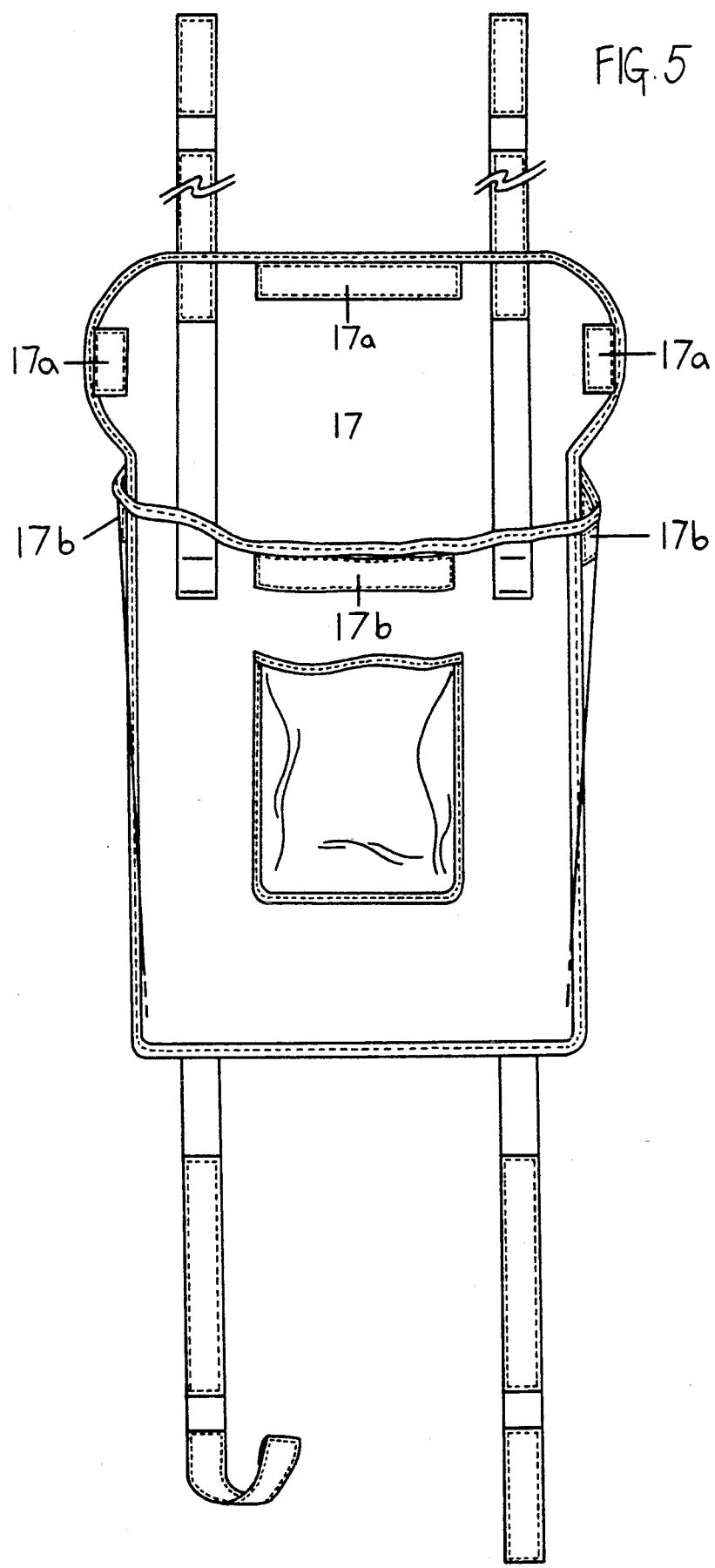
FIG. 5 shows the debris/storage bag laid flat and unattached with a flap closure for the opening of the debris/storage bag attached and hook and loop fasteners positioned to secure flap closure in place.

The straps 15, 16 in FIG. 1 and FIG. 2 have different pairings of fasteners 33ab., 34ab., 43ab., 44a., 44ab. to illustrate how the debris/storage bag 3 can attach to an object, in this case a lawnmower, when the distance is fixed and known between the top fastening position and the bottom fastening position FIG. 4 and when the distance is varied and unknown between the top fastening position and the bottom fastening position FIG. 3.

A debris/storage bag FIG. 2, FIG. 4 that attaches to a fixed and known distance uses preferably polypropylene webbing for both the top 15b. and bottom 16b. straps. The top strap 15b. fastens inside 3ab. the debris/storage bag 3a., using a plastic side release buckle 43ab. The male portion 43a. of the plastic side release buckle 43ab. is properly put on the top strap 15b. and the end of said strap 15b. is folded over and sewn 51 to prevent the buckle 43a. from sliding back off the strap 15b. The female portion 43b. of the plastic side release buckle 43ab. is located inside 3ab. the debris/storage bag 3a. and has a piece of preferably polypropylene webbing looped through the bottom of the buckle 43b. and sewn 52 on top of the bottom of the top strap 15b. connecting them both 43b., 15b. to the back panel 1 of the debris/storage bag 3a. The bottom strap 16b., preferably polypropylene webbing, is sewn under the binding 16a. for added strength and fastens to the object FIG. 4 at the lower position 49 with the use of a grommet 44c. and an S-hook 44a. In the case where the object is too large for the S-hook 44a. to attach to the lower position, a grommet 44b. has been added to the strap 16b. by pushing the strap 16b. together creating a double thickness that is perpendicular to the lower grommet 44c. and S-hook 44a. This added grommet 44b. can be positioned at any place along the strap 16b. generally toward the top of the strap 16b., allowing the bottom of the strap 16b. to be wrapped around the larger object and fastened by placing the S-hook 44a. through the grommet 44b. Once the S-hooks 44a. or S-hook/grommet 44ab. fasteners have been attached to the lower fastening position, then the ends 51 of the top straps 15b. can be pulled tight to remove any slack in the straps 15b., 16b. and debris/storage bag 3a. creating a very secure fit in a fixed area. Removal of the debris/storage bag 3 is accomplished easily by releasing the top fastener 43ab. and undoing the straps 15b. from around the top fastening position and undoing the fasteners 44a., 44ab. from the bottom fastening position. The length of the straps 15b., 16b. are determined by the distance between the top fastening position and the bottom fastening position of the object that the debris/storage bag 3 is attaching to.

A debris/storage bag FIG. 1, FIG. 3 that attaches when the distance between the top fastening position and the bottom fastening position is varied or unknown, has preferably polypropylene webbing for the top straps 15c. and woven polyester elastic webbing for the bottom straps 16c. The top 15c. and bottom 16c. straps attach for maximum adjustability with preferably hook and loop fasteners. The hook and loop fasteners 33ab., 34ab. combined with the stretching ability of the woven polyester elastic webbing is what gives the debris/storage bag 3 the unique ability to fasten properly to such a wide variety of objects.

The debris/storage bag 3a. is made out of material that best suits the use of the bag. If used on the handlebars of a lawn mower to put all yard debris in, it would preferably be made out of a weather resistant mesh, such as vinyl coated nylon or polyester mesh, to prevent accumulations of sand, grit and smaller debris in the bottom of the bag 3a. If the debris/storage bag 3a. were to be used in the cabin of a sailboat to store books, a solid material, such as nylon pack cloth would be more appropriate to keep the books dry in the event the debris/storage bag 3a. were to get wet.

The same holds true for the material used in making the attached pocket or pockets 12 shown in FIGS. 1, 2, 3, 4.

The debris/storage bag 3 can be attached in any position. If the position is such that the contents of the bag 3a. could or would fall out, then a flap closure 17 is required for the opening 10 of said bag 3a. This flap closure 17 is preferably made out of the same material as the bag 3a. and attaches preferably to the top of the back panel 1, having enough material to cover the entire opening 10 and to extend over the front panel 2 in sufficient length to attach preferably with loop fasteners 17a. sewn on the under side of the flap closure 17 to hook fasteners 17b. sewn in a corresponding position on the front panel 2 and be of proper fastening strength to keep the contents inside the debris/storage bag 3a.

The design of the debris/storage bag 3a. in FIG. 3 and FIG. 4 are the same. However, when attached to two different lawn mowers, with different handlebar configurations the debris/storage bag 3 secured best in two different positions. This accounts for the debris/storage bag 3a. in FIG. 3 opening away from the operator and the debris/storage bag 3a. in FIG. 4 opening toward the operator.

It is apparent that the objects, aims, and advantages already stated above have been fully satisfied by the present invention. Although the present invention has been described in relationships with specific embodiments, it is obvious that anyone with a sense of design or an understanding of how a debris/storage bag can be attached could make changes and take from the strength, simplicity and spirit of the present invention. Therefore, it is requested not to be bound by the foregoing except as may be required by the claims.

Having thus described the present invention I claim:

1. A lawnmower bag for attaching to a lawnmower having a lawnmower handle of the type having two elongated bars extending from the chassis of the lawnmower and at least one cross member perpendicular to the elongated bars, said bag comprising:
   a back panel having a top, a bottom and opposed sides;
   a front panel having a top, a bottom and opposed sides; said back and front panels joined at their respective bottoms and sides to form a bag with a closed bottom and sides and an open top;
   two top straps extending away from the bag from the top of said back panel;
   two bottom straps extending away from the bag from the bottom of said back panel;
   said top and bottom straps being substantially parallel to the sides of the bag;
   means on each top strap for fastening each respective top strap to itself to form a continuous single loop for locating each strap about a cross bar of the lawnmower;
   means on each bottom strap for fastening each respective bottom strap to itself for securement on a respective elongated bar.

2. The lawnmower bag of claim 1, wherein said bottom strap fastening means comprises a hook which can be attached to the lawnmower chassis.

3. The lawnmower bag of claim 1, wherein said bag has an exterior pocket on the front panel.

4. The lawnmower bag of claim 1, wherein the bag has a closure flap.

* * * * *